United States Patent
El-Aini et al.

(10) Patent No.: US 8,066,479 B2
(45) Date of Patent: Nov. 29, 2011

(54) NON-INTEGRAL PLATFORM AND DAMPER FOR AN AIRFOIL

(75) Inventors: Yehia M. El-Aini, Tequesta, FL (US); Myron L. Klein, Higganum, CT (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 0 days.

(21) Appl. No.: 12/753,934

(22) Filed: Apr. 5, 2010

(65) Prior Publication Data
US 2011/0243709 A1    Oct. 6, 2011

(51) Int. Cl.
*F01D 5/10*          (2006.01)
(52) U.S. Cl. ............... 416/1; 416/193 A; 416/196 R; 416/500; 416/190
(58) Field of Classification Search ............ 416/190, 416/193 A, 196 R, 500
See application file for complete search history.

(56) References Cited

U.S. PATENT DOCUMENTS

| | | | | |
|---|---|---|---|---|
| 2,936,155 | A * | 5/1960 | Howell et al. ............ | 416/134 R |
| 3,656,864 | A * | 4/1972 | Wagle ...................... | 416/190 |
| RE32,339 | E * | 1/1987 | Jones et al. ............... | 416/190 |
| 4,872,810 | A * | 10/1989 | Brown et al. ............. | 416/145 |
| 5,112,193 | A | 5/1992 | Greer et al. | |
| 5,161,949 | A * | 11/1992 | Brioude et al. .......... | 416/193 A |
| 5,205,713 | A | 4/1993 | Szpunar et al. | |
| 5,232,344 | A | 8/1993 | El-Aini | |
| 5,924,699 | A * | 7/1999 | Airey et al. .............. | 277/411 |
| 6,039,533 | A | 3/2000 | McCabe | |
| 6,053,696 | A | 4/2000 | Roberts | |
| 6,145,300 | A | 11/2000 | Romani | |
| 6,149,380 | A | 11/2000 | Kuzniar et al. | |
| 6,155,789 | A | 12/2000 | Mannava et al. | |
| 6,217,277 | B1 | 4/2001 | Liu et al. | |
| 6,227,794 | B1 | 5/2001 | Wojtyczka et al. | |
| 6,299,410 | B1 | 10/2001 | Hilbert et al. | |
| 6,409,469 | B1 | 6/2002 | Tse | |
| 6,652,222 | B1 | 11/2003 | Wojtyczka et al. | |
| 6,695,574 | B1 | 2/2004 | Mather | |
| 6,726,452 | B2 * | 4/2004 | Strassberger et al. ..... | 416/190 |
| 6,895,741 | B2 | 5/2005 | Rago et al. | |
| 6,973,193 | B1 | 12/2005 | Tse et al. | |
| 6,991,428 | B2 | 1/2006 | Crane | |
| 7,153,099 | B2 * | 12/2006 | Queriault et al. ........ | 416/2 |
| 7,156,621 | B2 | 1/2007 | Stone | |
| 7,204,676 | B2 | 4/2007 | Dutton et al. | |
| 7,353,588 | B2 | 4/2008 | Crain et al. | |
| 7,360,997 | B2 | 4/2008 | Wagner et al. | |
| 7,399,158 | B2 | 7/2008 | Care et al. | |
| 7,399,159 | B2 | 7/2008 | Matheny et al. | |
| 7,492,910 | B2 | 2/2009 | Kashani | |
| 7,540,450 | B2 | 6/2009 | Brand et al. | |
| 2010/0158686 | A1 * | 6/2010 | Kim et al. ............... | 416/1 |

* cited by examiner

*Primary Examiner* — Edward Look
*Assistant Examiner* — Liam McDowell
(74) *Attorney, Agent, or Firm* — Carlson Gaskey & Olds PC

(57) ABSTRACT

A section of a gas turbine engine includes a damper which extends from a disk between a first blade and a second blade to provide a dissipating vibratory motion energy in the form of friction heating.

12 Claims, 4 Drawing Sheets

NON-INTEGRAL PLATFORM AND DAMPER FOR AN AIRFOIL

BACKGROUND

The present disclosure relates to gas turbine engines and, more particularly, to damping mechanisms which reduce vibratory stress levels in the rotor blades thereof.

Gas turbine engines typically have rows of circumferentially spaced blades mounted on respective rotor disks for rotation about an engine axis. Advanced configurations feature shroudless hollow airfoils manufactured of light weight materials. The blades are designed to high tolerances to accommodate significant operational requirements such as cross-winds and inlet distortion. These requirements result in blades that may be prone to high vibratory responses and possible aeroelastic instability within some operational speed ranges. To mitigate these effects, the blades may be damped.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
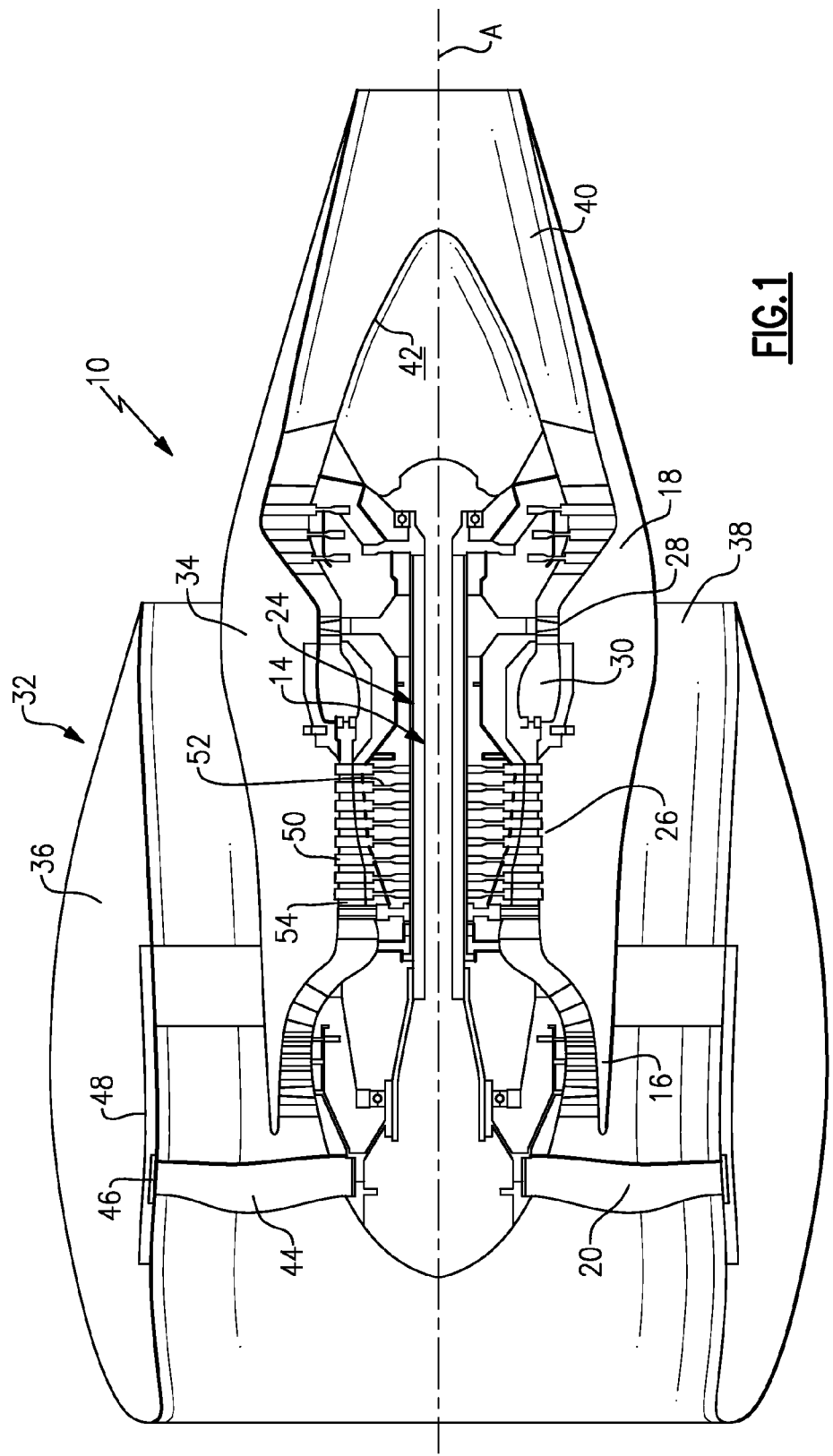
FIG. 1 is a general schematic view of an exemplary gas turbine engine for use with the present disclosure.

FIG. 1 illustrates a general schematic view of a gas turbine engine 10 such as a gas turbine engine for propulsion. The exemplary engine 10 in the disclosed non-limiting embodiment is in the form of a two spool high bypass turbofan engine. While a particular type of gas turbine engine is illustrated, it should be understood that the disclosure is applicable to other gas turbine engine configurations, including, for example, gas turbines for power generation, turbojet engines, low bypass turbofan engines, turboshaft engines, etc.

The engine 10 includes a core engine section that houses a low spool 14 and high spool 24. The low spool 14 includes a low pressure compressor 16 and a low pressure turbine 18. The core engine section drives a fan section 20 connected to the low spool 14 either directly or through a gear train. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The exemplary engine 10 is mounted within a nacelle assembly 32 defined by a core nacelle 34 and a fan nacelle 36. The bypass flow fan air is discharged through a fan nozzle section 38 generally defined between the core nacelle 34 and a fan nacelle 36. Air compressed in the compressor 16, 26 is mixed with fuel, burned in the combustor 30, and expanded in the turbines 18, 28. The air compressed in the compressors 16, 18 and the fuel mixture expanded in the turbines 18, 28 may be referred to as a hot gas stream along a core gas path. The core exhaust gases are discharged from the core engine through a core exhaust nozzle 40 generally defined between the core nacelle 34 and a center plug 42 disposed coaxially therein around an engine longitudinal centerline axis A.

The fan section 20 includes a plurality of circumferentially spaced fan blades 44 which may be made of a high-strength, low weight material such as an aluminum alloy, titanium alloy or combinations thereof. An annular blade containment structure 46 is typically disposed within a fan case 48 which circumferentially surrounds the path of the fan blades 44 to receive blade fragments which may be accidentally released and retained so as to prevent formation of free projectiles exterior to fan jet engine 10.

The compressor 16, 26 includes alternate rows of rotary airfoils or blades 50 mounted to disks 52 and static airfoils or vanes 54 which at least partially define a compressor stage. It should be understood that a multiple of disks 52 may be contained within each engine section and that although a single fan stage is illustrated and described in the disclosed embodiment, other stages which have other blades inclusive of fan blades, high pressure compressor blades and low pressure compressor blades may also benefit herefrom.

Figure 2:
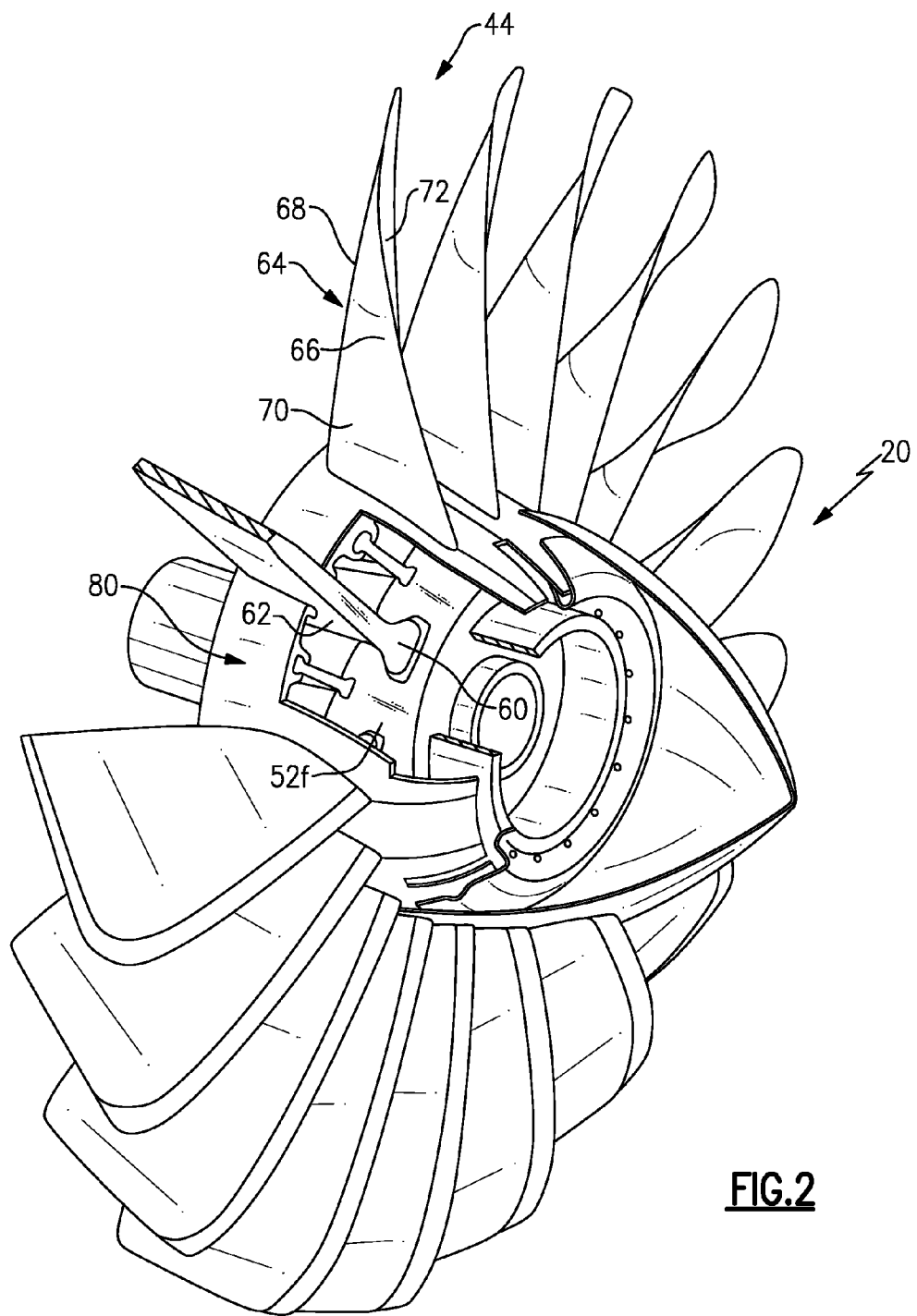
FIG. 2 is a perspective, partial sectional view of a fan section.
Figure 3:
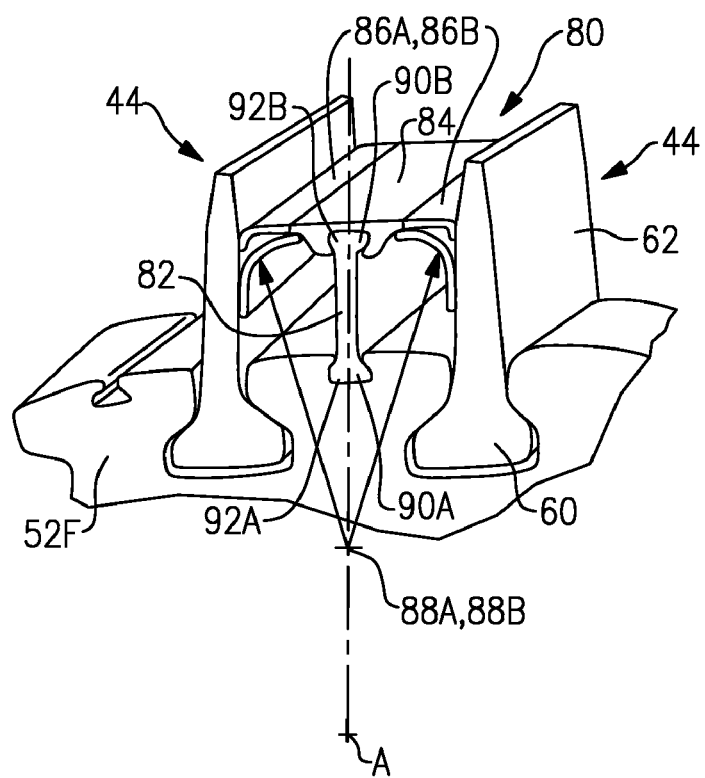
FIG. 3 is a schematic view of a damper assembly mounted between adjacent fan blades, with the airfoil portion of the fan blade removed for clarity.

Referring to FIG. 2, each fan blade 44 generally includes an innermost root portion 60, an intermediate portion 62, and an outermost airfoil portion 64. In one form, the root portion 60 defines an attachment such as an inverted "fir tree"-like shape, bulb, or dovetail so the fan blade 44 is slidably received in a complimentary configured recess provided in a fan rotor disk 52F (FIG. 3). The intermediate portion 62 generally separates the root portion 60 and the airfoil portion 64 to generally define an inner boundary of the air flow path. The airfoil portion 64 defines a blade chord between a leading edge 66, which may be swept forward and a trailing edge 68. A concave suction side 70 and a convex pressure side 72 are defined between the leading edge 66 and the trailing edge 68. Although a fan blade 44 is illustrated in the disclosed non-limiting embodiment, it should be understood that compressor blades, turbofan blades, turboprop propeller blades, tilt rotor props and other airfoils may benefit herefrom.

Referring to FIG. 3, a flow path seal assembly 80 includes a support 82, a platform 84, a flowpath seal 86A, 86B and a damper 88A, 88B. The flow path seal assembly 80 is mounted between each adjacent fan blade 44 to provide a flow path seal adjacent an intermediate portion 62 to define an inner diameter flow path. That is, the flow path seal assembly 80 is repeated between each pair of adjacent blades 44 around disk 52F.

The support 82 includes a root portion 90A that defines an attachment such as an inverted "fir tree"-like shape, bulb, or dovetail so the support 82 is slidably received in a complimentary configured recess 92A provided in the disk 52F. The support 82 also includes a tip portion 90B opposite the root portion 90A that defines an attachment such as an inverted "fir tree"-like shape, bulb, or dovetail so the platform 84 is slidably received onto the support 82 in a complimentary configured recess 92B provided in the platform 84. That is, the platform 84 is displaced from the disk 52F.

The flowpath seals 86A, 86B and the dampers 88A, 88B are mounted to the platform 84 through, for example, continuous welds, mechanical fasteners or various combinations thereof. The flowpath seals 86A, 86B and the dampers 88A, 88B extend from each side of the platform 84 to engage the adjacent fan blades 44 to cover at least a portion of the intermediate portion 62 of the fan blade 44 to ensure aerodynamic efficiency and damp the fan blades 44 for fundamental modes of vibration namely, first bending, second bending, and first torsion modes.

The flowpath seals 86A, 86B define the inner boundary of the fan section 20 flow path. The flowpath seals 86A, 86B define a minimal gap or just barely contact the fan blade 44.

The dampers 88A, 88B contact and ride upon the fan blade 44 as the fan blade 44 deforms in the particular vibration mode. In one non-limiting embodiment, the thickness and curvature of the dampers 88A, 88B are manufactured of a sheet metal to provide a stiffness and sufficient normal load against the intermediate portion 62 of the fan blade 44 that, in one non-limiting embodiment, is on the order of 20 to 40 lbs/inches.

Figure 4:
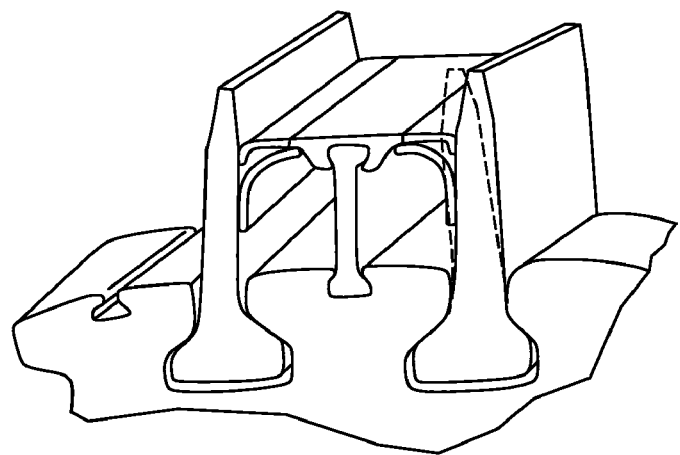
FIG. 4 is a schematic view of the damper assembly of FIG. 3 in a deflected position.

The centrifugal forces of the fan section 20 tends to load the dampers 88A, 88B against the fan blade 44 and the deformation thereof tends to create slippage in the radial direction. The dampers 88A, 88B are optimized for curvature and thickness to provide a normal load for best stress reduction. The normal load from the dampers 88A, 88B on the respective fan blades 44 is due to centrifugal loading (FIG. 4). Slippage of the dampers 88A, 88B against the respective fan blade 44 occurs when the elastic force in the dampers 88A, 88B exceeds the friction force at the contact interface.

Figure 5:
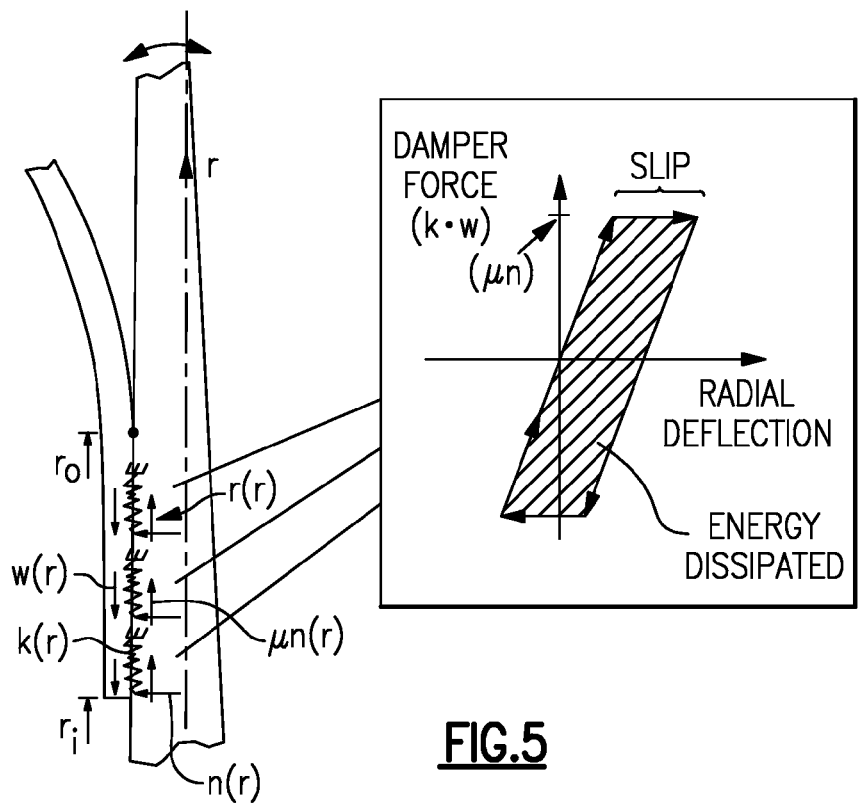
FIG. 5 is an idealization schematic representation of a force balance between the damper assembly and a fan blade contact interface.

An idealization of the force balance at the damper 88B to fan blade 44 contact interface is schematically illustrated in FIG. 5. Although the contact interface between the fan blade 44 and the damper 88B will be described in detail herein, it should be understood that such description is applicable to each contact interface.

Referring to FIG. 5, first, the damper forces at the interface are generated due to the centrifugal loading as well as the motion of the fan blade 44. These forces are designated as n[r] as they vary with the radial location on the fan blade 44. Second, the fan blade motion will impart a radial deflection w[r] at the contact interface. These deflections will tend to stretch or contract the damper 88B to generate internal elastic forces in the damper 88B because of the damper stiffness k[r]. The damper 88B (FIG. 4) will remain fixed relative to the fan blade 44 as long as the damper elastic force k[r]×w[r] is less than the friction force μn[r]. As the amplitude of vibration increases, the elastic force in the damper 88B will increase beyond the friction force leading to a slip at the contact interface. With the repeated vibratory motion, energy is dissipated in the form of frictional heating.

Figure 6:
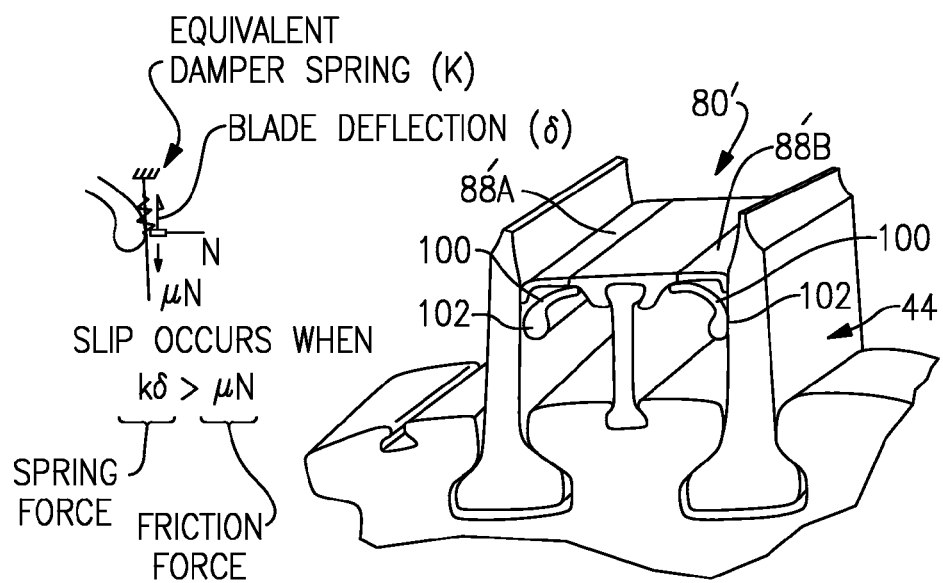
FIG. 6 is a schematic view of a damper assembly according to another non-limiting embodiment mounted between adjacent fan blades, with the airfoil portion of the fan blade removed for clarity.

Mathematically, slip between the damper 88B and the fan blade 44 may be defined by the following equation:

$$\int_{ri}^{ro} K(r) \times w(r) dr \bigg| \mu n(r) dr \quad [1]$$

where=
k(r) is damper stiffness in r-direction
w(r) is damper deflection in direction of slip
μ is coefficient of friction between damper and blade
n(r) is normal contact force due to centrifugal forces Referring to FIG. 6, another non-limiting embodiment of the damper assembly 80' includes dampers 88'A, 88'B. Each damper 88'A, 88'B provides a relatively thick wall section 100 similar to 88'A, 88'B with a blunt end 102. The blunt end 102 provides for a more localized contact with the fan blade 44. The damper assembly 80' functions on the same basic principles as the damper assembly 80 discussed above with regard to the slip force in relation to the friction force at the interface between the damper 88'A, 88'B, and the fan blade 44. The damper 88' increase in thickness and cross section to provide a relatively stiffer configuration that allows slip at smaller amplitudes of vibration. The localization of the contact area by the blunt end 102 results in a well defined slip pattern generally referred to as macro-slip as compared to the non-limiting embodiment described above in which the contact region is spread over a relatively larger area and the contact forces are not necessarily uniform leading to non-uniform slip patterns, generally referred to as micro-slip.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A damper assembly of a gas turbine engine comprising:
   a platform mountable to a disk through a support;
   a first damper attached to said platform, said first damper engageable with a first blade attachable to the disk;
   a second damper attached to said platform, said second damper engageable with a second blade attachable to the disk;
   a first seal which extends toward the first blade; and
   a second seal which extends toward the second blade, said first seal and said second seal radially outboard of said respective first damper and said second damper.

2. The assembly as recited in claim 1, further comprising:
   a first seal which extends toward the first blade and a second seal which extends toward the second blade, said first seal and said second seal radially outboard of said respective first damper and said second damper.

3. The assembly as recited in claim 1, wherein said first damper and said second damper are flexed inboard toward the disk to provide a contact interface with the first blade and the second blade, respectively.

4. A section of a gas turbine engine comprising:
   a disk;
   a first blade attached to said disk;
   a second blade attached to said disk;
   a damper assembly which extends from said disk between said first blade and said second blade, said damper assembly includes a first damper which engages said first blade and a second damper which engages said second blade;

a first seal which extends toward the first blade; and a second seal which extends toward the second blade, said first seal and said second seal radially outboard of said respective first damper and said second damper.

5. The section as recited in claim 4, wherein said first seal, said second seal, said first damper and said second damper extend from a platform.

6. The section as recited in claim 5, wherein said platform is mounted to said disk through a support.

7. The section as recited in claim 6, wherein said support extends generally along an axis of rotation of said disk.

8. The section as recited in claim 4, wherein said first damper and said second damper are flexed inboard toward said disk to provide a contact interface with said first blade and said second blade, respectively.

9. The section as recited in claim 8, wherein said first damper and said second damper each define a blunt end in contact with said first blade and said second blade respectively.

10. The section as recited in claim 4, wherein said first damper engages an intermediate portion of said first blade and said second damper engages an intermediate portion of said second blade, said intermediate portion of said first blade and said second blade generally separates a root portion and an airfoil portion to generally define an inner boundary of an air flow path.

11. The section as recited in claim 4, wherein said first blade and said second blade are fan blades.

12. A method of damping a blade in a gas turbine engine comprising:

dissipating vibratory motion between a blade and a damper assembly in the form of friction heating; and sealing an inner boundary of an air flow path between a first and a second blade radially outboard of the damper assembly using a first seal which extends toward the first blade and a second seal which extends toward the second blade, wherein the damper assembly includes a first damper engageable with the first blade and a second damper assembly engageable with the second blade.

* * * * *